United States Patent [19]

Craig

[11] Patent Number: 4,474,852

[45] Date of Patent: Oct. 2, 1984

[54] HYDROPHOBIC COLLOIDAL OXIDE TREATED CORE MATERIAL, METHOD OF PRODUCTION AND COMPOSITION COMPRISED THEREOF

[75] Inventor: Charles E. Craig, Victoria, Canada

[73] Assignee: Thomas B. Crane, Falls Church, Va.

[21] Appl. No.: 496,919

[22] Filed: May 23, 1983

[51] Int. Cl.$^3$ .................. B05D 1/36; B05D 7/00; B32B 5/16

[52] U.S. Cl. .................... 428/403; 427/204; 427/205; 427/214; 427/221; 428/404; 428/407

[58] Field of Search ............ 427/214, 204, 221, 205; 428/404, 407, 403

[56] References Cited

U.S. PATENT DOCUMENTS

| | | | |
|---|---|---|---|
| 3,562,153 | 2/1971 | Tully et al. | 210/36 |
| 3,567,492 | 3/1971 | Burrill | 94/23 X |
| 3,672,945 | 6/1972 | Taylor | 71/64 X |
| 3,973,510 | 8/1976 | McCulloch et al. | 114/67 A |
| 3,980,566 | 9/1976 | Peterson | 427/214 X |
| 4,148,941 | 4/1979 | Pape et al. | 427/214 |
| 4,256,501 | 3/1981 | Banino | 427/221 X |

Primary Examiner—Michael R. Lusignan
Attorney, Agent, or Firm—Stephen F. K. Yee

[57] ABSTRACT

An improved hydrophobic composite is prepared by depositing on a particulate or granular core material an adherent first coat comprising a film-forming polyurethane and, optionally, asphalt, and applying to the thus-coated core material a hydrophobic colloidal oxide, such as hydrophobic fumed silica. The composites are useful in various waterproofing applications, as well as in cleaning up oil spills.

27 Claims, No Drawings

HYDROPHOBIC COLLOIDAL OXIDE TREATED CORE MATERIAL, METHOD OF PRODUCTION AND COMPOSITION COMPRISED THEREOF

BACKGROUND OF THE INVENTION

The present invention relates to a method for making hydrophobic composites, the resulting composites, and a coating composition containing same. More particularly, the present invention is directed to improved hydrophobic composite aggregates prepared by physically bonding a hydrophobic colloidal oxide to the individual aggregate particles, such as sand, gravel or slag, to provide a product which is useful in various waterproofing applications and in cleaning up oil spills.

A number of water-repellent composite materials composed of various absorbent substrates coated with organo-silicon compositions have been proposed for use in removing oil or oil film from water contaminated therewith. One such material is disclosed in Tully et al., U.S. Pat. No. 3,562,153, entitled "Oil Absorbent Compositions". The oil absorbent compositions of the Tully et al. patent are obtained by treating a liquid absorbent material, which may be particulate, granular or fibrous in nature, with a colloidal metal or metalloid oxide which is chemically bonded to an organo-silicon compound to render the metal or metalloid oxide hydrophobic. The hydrophobic oxide-treated absorbent composition is contacted with the oil-contaminated water and selectively removes the oil therefrom. The oil absorbent composition of Tully et al. is purported to have excellent water repellency, thus enabling it to maintain its oil absorbent efficiency for long periods of immersion in water.

SUMMARY OF THE INVENTION

It has now been discovered, in accordance with the present invention, that hydrophobic composites having superior water repellency are obtainable by depositing on a core material an adherent first coat which comprises a film-forming polyurethane and asphalt, as an optional additive, and applying to the thus coated core material a second coat comprising a hydrophobic colloidal oxide of an element selected from the group consisting of silicon, titanium, aluminum, zirconium, vanadium, chromium, iron or mixtures thereof. Hydrophobic composites prepared in this manner not only prevent water from adhering to the surfaces of the individual composite particles, but also from entering the interstitial spaces of the aggregates of the composites. It is believed that the hydrophobic composites prepared in accordance with this invention provide more durable water repellency than is obtainable from materials of this kind heretofore available.

Like the oil absorbent compositions described in the aforementioned Tully et al. patent, the hydrophobic composites of the present invention have utility in cleaning up oil spills, and may be applied to oil spills on water, on land, e.g. beaches, or on paved surfaces.

Moreover, the hydrophobic composites described herein are especially useful in numerous waterproofing applications. They may be used alone as a waterproofing agent in building and pavement construction, for example, as a fill or bed material under concrete slabs or as a wall coating, both below and above ground, or as a gravel fill or ballast for road beds or sidewalks. The composites may also be used as a substitute for common aggregate in asphalt roofing or shingles, or in built-up roofing. In such applications, the hydrophobic composites are effective in preventing water penetration and resulting damage caused by freeze/thaw cycles as well as dimensional changes due to wetting and drying. The hydrophobic composites of the present invention also have utility as a top coat on paved surfaces, such as asphalt or concrete road surfaces or bridge decking, providing an extremely water-tight finish which substantially reduces freeze/thaw damage, and which is unaffected by salt compositions normally used for ice removal. In addition, these hydrophobic composites may be applied to painted surfaces to provide a durable, waterproof finish over wood, metal, concrete, stone, brick, and certain synthetic substrates.

The hydrophobic composites of the present invention may also be blended with suitable binding agents to provide a coating composition having excellent water repellency.

DETAILED DESCRIPTION OF THE INVENTION

A wide variety of inorganic or organic substances may be used as the core material of the hydrophobic composite. The core material may be either solid or porous and includes sand, gravel, mine tailings, coal ash, natural rock, smelter slag, diatomaceous earth, crushed charcoal, sawdust, mica, wood chips, nut shells, and the like. Inorganic materials are favored from the standpoint of cost and availability. Particularly satisfactory composites have been obtained using inorganic siliceous substances such as sand, gravel or slag. Sources of these materials are conveniently available world wide.

The physical form of the core material may vary, with particulate or granular materials having a particle size between 25.0 millimeters (1 inch) and 125 microns (1/200 inch) being preferred. Particle sizes above 25.0 millimeters tend to be difficult to coat uniformly with the coatings applied in practicing this invention. Particle sizes smaller than 125 microns tend to require excessive amounts of the coatings, making the preparation uneconomical. Core materials in the preferred particle size range are easily obtained using standard sizing techniques.

The core material should contain no more than 1% by weight of moisture. This degree of dryness may be achieved by air drying or conventional heating methods. Higher levels of moisture interfere with sizing of the core materials and prevent uniform coating of the core material surfaces.

As mentioned above, the adherent first coat which is deposited on the core material serves to anchor the subsequently applied hydrophobic outer coat. The first coat comprises a film-forming polyurethane, alone, or in combination with asphalt, the latter providing an increase in the anchoring quality of the first coat over a longer period of time and an increased attraction for oil and oil related products. Any of the film-forming polyurethanes commonly employed in the field of coatings may be used in the practice of the present invention. Included in this category are the well-known two-component and one-component polyurethane coating systems. The two-component systems are formed by the reaction of an aliphatic or aromatic isocyanate with a hydroxyl-bearing compound, such as polyfunctional polyesters based on adipic acid, phthalic anhydride, ethylene glycol and trimethylolpropane, for example.

Representative of the one-component polyurethane coating systems that may be employed as the first coat are those derived from stable isocyanate-terminated prepolymers formed from an aliphatic or aromatic isocyanate and polyfunctional polyether or polyester. These one component systems are commonly referred to as "moisture cured" polyurethane coatings because drying results from the reaction of the free-isocyanate groups of the pre-polymer with water or atmospheric moisture. Another one-component polymer coating which may be used in the preparation of the hydrophobic composites is the "urethane oil" or "uralkyd", which is the reaction product of a diisocyanate with a hydroxyl-containing drying oil derivative, e.g., that produced by alcoholysis of an unsaturated glyceride with a polyol, such as trimethylolpropane.

A commercial polyurethane composition sold under the name "Urethane Clear 66 High Gloss" by C.I.L. Paints, Inc., Montreal, Canada, has been found to produce a strong bond between the core material and the hydrophobic second coat.

When asphalt is included in the adhesive first coat, it may be present in an amount up to one hundred percent (100%) by weight of the film-forming polyurethane i.e., in an amount up to about 50% by weight of the first coat. The term "asphalt" as used herein refers to a dark brown to black cementitious material in which the predominate constituents are bitumens that occur in nature or are obtained in petroleum processing, the latter being preferred, primarily because of its greater availability. The asphalt component of the adherent first coat may be either solid, semi-solid or liquid, so long as it forms a homogeneous composition with the volatile solvent used to deposit the first coat on the core material. The classes of liquid asphalts known as rapid-setting emulsions and cut-backs are especially suited to the process of the present invention due to their ease of handling. Such asphalts are commonly used as seal coats on paved surfaces. Particulary satisfactory first coats have been obtained using a commercially available asphalt sealer sold under the name "Black Topper Driveway Resurfacer" by Tone Craft Ltd., Toronto, Canada.

In general, the adherent first coat constitutes from about 0.025% to about 0.25% by weight of the finished composite, depending upon the particle size and surface nature of the core material which determine the total surface area required to be coated.

The adherent first coat is easily applied to the core materials by dissolving the film-forming polyurethane and asphalt, if desired, in a volatile solvent to form a homogeneous coating composition, contacting the core materials with the coating composition, and removing the volatile solvent from the coating composition, thereby to deposit the adherent first coat uniformily over the surfaces of the core materials. The volatile solvent is conveniently removed by evaporative heating. Since the volatile solvent merely functions as a vehicle for depositing the first coat on the core materials, virtually any volatile solvent in which the components of the first coat are soluble may be used. Good results have been obtained using petroleum distillates, such as mineral spirits or paint thinner. Such solvents have a boiling point between about 200° and 400° F. and are readily evaporated from the mixture of core materials and coating composition by conventional heating means.

The hydrophobic second coat used in the practice of this invention is a hydrophobic colloidal oxide of an element selected from the group of silicon, titanium, aluminum, zirconium, vanadium, chromium, iron or mixtures thereof. In general, colloidal oxides having an average particle size of less than 1 micron are preferred. Oxides of higher average particle size should be avoided because their reduced organic surface area would in turn reduce the number of hydrophobic siloxane groups attached to their surfaces; lower particle size oxides are undesirable because of increased cost of production. The oxide is rendered hydrophobic via a chemisorption reaction with certain well-known organo-silicons, which have long been used for this purpose. The oxide surface must have sufficient reactive hydroxyl-groups to undergo reaction with the organo-silicon compound. In general, at least about 0.25 milliequivalents per gram of hydroxyl-groups is required. Various organo-silicon compounds bearing reactive functional moieties will undergo reaction with the surface hydroxyl-groups on the oxides to chemically bond the organo-silicon compound to the oxide. Specific examples of such compounds include organo-halosilanes such as $(CH_3)_3SiCl$, $(CH_3)_2SiBr_2$, $(CH_3)_2SiCl_2$, $(C_4H_9)_3SiCl$ or organosilylamines such as $(CH_3)_3Si(CH_2)_3NH(CH_2)_2NH_2$, and $(CH_3O)_2(CH_3)SiCH_2CH(CH_3)CH_2NHCH_2CH_2NH_2$, among others.

The details of the processes available for the chemisorption reaction between colloidal oxides and organo-silicons are well-documented in both the patent and scientific literature and are familiar to those skilled in the art.

Colloidal silicas are the colloidal oxides of choice because of availability and reasonable prices. A hydrophobic fumed silica made by Tulco Inc., Talbot Mills Industrial Park, North Billerica, Mass., and sold under the name "Tullanox 500" has been found to provide an excellent hydrophobic second coat. This product is derived from fumed silica (99.8% $SiO_2$), the individual particles of which have chemically bonded to their surfaces hydrophobic trimethylsiloxyl groups of the formula $(CH_3)SiO—$. "Tullanox 500" has an extremely large surface area, enabling it to impart superior water-repellency when applied in relatively low concentrations to the core materials having the adherent first coat thereon. As used herein, the term "fumed silica" refers to a colloidal form of silica made by combustion of silicon tetrachloride in hydrogen-oxygen furnaces.

In general, the hydrophobic second coat constitutes from about 0.025% to about 0.25% by weight of the finished composite, depending upon the particle size and surface nature of the core material which determine the total surface area required to be coated.

In coating applications in which the hydrophobic composites are exposed to the elements or to continuous wear over long periods of time, it is avantageous to incorporate a powdered abrasive in an amount up to about 0.25% by weight of the finished composite. A suitable abrasive for this purpose is powdered corundum ($Al_2O_3$) of a particle size of less than 50 microns (1/500 inch).

The general procedure for preparing the hydrophobic composites of the present invention will now be described.

The core material, which, as indicated above, is preferably a particulate or granular material such as sand, gravel or slag, is dried to a moisture content of less than 1% and sized as required for the intended end use of the composite. Next, the core material is mixed with a coating composition comprising, by weight, from about 10% to about 20% of a film-forming polyurethane, from 0% to about 10% of asphalt, and from about 70% to about 90% of a volatile solvent, e.g., a petroleum distillate, in which the film-forming polyurethane and asphalt are soluble. The amount of coating composition used to deposit the adherent first coat may be up to about 1.0% by weight of the dry core material. The required amount of the coating composition will vary depending on the particle size and nature of the core material. For example, considerably less than 1.0% of the coating composition is needed for relatively coarse core material, i.e. material having a particle size larger than 750 microns (1/32 inch) The use of coating composition in an excess of 1.0% by weight of the dried core material is unnecessary unless the core material is open-celled, requiring an increase in coating composition to insure coverage of the entire surface area. Mixing is conveniently carried out by tumbling the core material and coating composition together in a conventional tumbling apparatus such as a drum mixer. The mixture is then heated to a temperature of between 200° F. and 400° F. to effect substantially complete vaporization of the solvent, leaving the core material uniformly covered with the adherent first coat. The core material with the adhesive first coat thereon is contacted with the hydrophobic colloidal oxide and powdered abrasive (depending on the intended end use) which become bonded to the core material by the adherent first coat. Here again, tumbling is the method of choice for applying the hydrophobic second coat. The resulting hydrophobic composites are cooled to ambient temperature and packaged, if desired. It is estimated that the processing time for production of the hydrophobic composite by the above procedure on a commercial scale, from drying through packaging, would take from about 30 to about 90 minutes.

The hydrophobic composite produced by the above procedure is non-toxic, non-dusting and as free-flowing as the uncoated starting core material. When immersed in water, an aggregate of the hydrophobic composites takes on a putty-like consistency, but upon removal from the water is dry and becomes free-flowing once again.

The process of the present invention produces no chemical change in the starting core material. The changes that result are strictly physical. Thus, the coating composition wets out the surfaces of the core materials and, on heating, the volatile solvent component of the coating composition evaporates, depositing a uniform adherent first coat on the core materials. Upon mixing of the hydrophobic colloidal oxide and abrasive (if used) with the core material having the first coat thereon, the former becomes firmly bonded to the latter.

The hydrophobic composites of the present invention may be applied to a substrate to be coated therewith in any desired manner, such as by spraying, trowelling or flowing. The rate of application of hydropobic composite will vary in thickness according to use and function.

When the hydrophobic composites are employed as a top coat on paved surfaces, such as asphalt or concrete, a flood coat of asphalt sealer should first be applied over the surface, immediately after which a heavy coat of the hydrophobic composites is sprayed over and rolled into the asphalt sealer, providing an extremely watertight top coat. The same top coating technique may be used in pot hole repairs in roadways. Lining of the pot hole with the hydrophobic composites also prevents water penetration from underneath the roadbase. A top coat of the hydrophobic composites may be applied in similar fashion following conventional spray coating of traffic markings on road surfaces, to provide a water-repellent, durable finish with improved visibility in the rain and at night. The hydrophobic composites may also be applied over a coat of adherent material, such as asphalt or paint, to various metal substrates to prevent oxidation of the metal and are especially useful in rust prevention.

Also within the scope of the present invention are water-repellent coating compositions comprising an aggregate of the hydrophobic composites described herein and a liquid binding agent. Suitable liquid binding agents are the same asphalts as used in the adhesive first coat of the hydrophobic composites, or any asphalts or coal tars used in conventional paving or roofing operations, or any liquid binding agent such as paint, varnish, lacquer, liquid plastic or adhesive which will accept and retain the hydrophobic composites. The amount of liquid binding agent used in preparing the composition will generally range from 5% to 10% by weight, depending on the average particle size of the aggregate. The smaller the average particle size of the aggregate, the lower the amount of binding agent required. The coating composition is applied by spraying, brushing or flooding the liquid binder over the material to be coated (metal, wood, concrete, asphalt, etc.), followed by application of the hydrophobic composite in an even layer onto the binder by spraying or flooding, followed by conventional rolling or other pressure application as required to insure penetration of the composite into the binder.

The following examples further describe the manner and process of making and using the invention and set forth the best mode contemplated for carrying out the invention, but are not to be construed as limiting the invention.

EXAMPLE 1

Ordinary sand obtained from a commercial sand and gravel pit in Victoria, B.C., Canada, was dried by heating in an electric furnace to a moisture content of less than 1% by weight. The sand was sized using a Tyler screen to remove particles in excess of 1.5 millimeters (1/16 inch) and the remaining sand was collected. One thousand (1,000) grams of the collected sand was placed in a closed metal cylinder with five (5) grams of coating composition containing ½ gram of film-forming polyurethane (Urethane Clear 66 High Gloss), ½ gram of asphalt (Black Topper Driveway Resurfacer) and four (4) grams of a volatile petroleum distilllate ("Shell Sol", available from Shell Canada Limited, Don Mills, Ontario, Canada). The amount of the coating composition was 0.5% by weight of the dry sand. The sand and coating composition were tumbled together in the closed metal container for five (5) minutes. Thereafter, the mixture of sand and coating composition was heated in the tumbling apparatus to a temperature of about 200° F. to evaporate the solvent, thereby depositing a uniform adherent coating of the polyurethane and asphalt on the individual sand particles. Evaporation of the solvent required about 30 minutes. A mixture of one (1) gram of hydrophobic fumed silica (Tullanox 500) and one (1) gram of powdered corundum was then added to the metal cylinder and mixed with the coated sand particles to apply thereto a hydrophobic outer coat. The resulting hydrophobic sand was then cooled to room temperature.

The following example sets forth the results of a test carried out to evaluate the durability of the hydrophobic composites of the present invention.

EXAMPLE 2

The testing of any given water-repellent granular material by immersing in water and determining the time required for the material to absorb a measurable amount of water can be quite time consuming. This is particularly true of highly water-repellent materials which are able to resist water absorption for many months, or even years. The test described in this example was designed for evaluating the water-repellency of materials in the latter category by accelerating the rate of water absorption so that absorption occurs within a reasonable time frame. In carrying out this test, advantage is taken of the known tendency of detergents to destroy the water-repellency of hydrophobic substances and rapidly increase the rate of water absorption of such substances.

A mild detergent solution was prepared comprising, by weight, 7.5% of a common household detergent ("Sunlight Detergent", available from Lever Detergents, Limited, Toronto, Canada) and 92.5% distilled water. The solution was well shaken and allowed to stand for at least 24 hours.

Three separate test samples were made up using ordinary sand dried to a moisture content of 0% and having a particle size between 1500 microns (1/16 inch) and 125 microns (1/200 inch). Each sample weighed one hundred (100) grams. Sample A comprised untreated sand and was used as a control. Sample B was treated by mixing it in the dry state with 0.10% by weight of hydrophobic fumed silica (Tullanox 500) in the manner described in the aforementioned Tully et al. patent. Sample C, by processing in accordance with this invention, was provided (after solvent evaporation) with 0.10% by weight of an adherent first coat made up of a 50:50 blend of Urethane Clear 66 High Gloss and Black Topper Driveway Resurfacer and a 0.10% by weight outer coat of hydrophobic fumed silica (also Tullanox 500). Twenty (20) grams of each sample was placed in a clear plastic vial approximately 1¼ inches in diameter and 2½ inches in height and leveled by shaking. A concave indentation approximately ¾ of an inch in diameter was made in the upper surface of the material in each vial. One (1) ml. of the detergent solution was drawn into an eye dropper and, with the eye dropper held within ⅛ inch of the upper surface of the sample, the detergent solution was carefully dispensed into the indentation.

The time required for the detergent solution to be completely absorbed in the indentation of each sample was then accurately measured. Absorption was deemed to be complete when reflected light from the solution in the indentation was no longer visible. It is considered safe to assume that each minute of time required for complete absorption of the detergent solution roughly corresponds to a minimum of 100 days for the complete absorption of ordinary water, i.e., containing no detergent. This rough time equivalency is based on long-term testing of 100 grams of Sample B material, treated with only 0.01% (rather than 0.10%) by weight of Tullanox 500, which sample was kept submerged in four (4) inches of ordinary water and showed no indication of water absorption after 150 days (a portion removed from under the water being dry and free flowing), but which had absorbed 2% of its own weight of water after 200 days of submersion. A retained sample of the same material, not submerged in water, was tested as above with the detergent solution and had an average absorption time of 1.2 minutes on five (5) samples tested.

The following table sets forth the average results of five (5) tests conducted, as described on page 12, on each Samples A, B, and C.

| Sample | Absorption Time (in min.) for Detergent Solution | Absorption Time (in days) For Ordinary Water |
|---|---|---|
| A | less than 1/60 minute* | less than 1/60 minute* |
| B | approximately 15 minutes | at least 1500 days |
| C | approximately 75 minutes | at least 7500 days |

*Absorption occurred immediately

These test results indicate that the hydrophobic composite prepared in accordance with the present invention, i.e. wherein the hydrophobic outer coat is bonded to the core material by an adherent intermediate coat, provides more durable water repellency than a similar hydrophobic material without an adherent intermediate coat.

The core material employed in the foregoing examples may be replaced, if desired, by gravel, mine tailings, coal ash, natural rock, smelter slag, diatomaceous earth, crushed charcoal, sawdust, mica, wood chips, or nut shells. Similarly, the components of the coating composition used to apply the adherent first coat may be replaced by equivalent materials. For instance, most fast-drying liquid plastics may be used as a substitute for the Urethane Clear 66 High Gloss, most cut-back and emulsified liquid asphalts or coal tars may be used as a substitute for the Black Topper Driveway Resurfacer, and most paint thinners or mineral spirits may be used as a substitute for the Shell Sol solvent. In addition, hydrophobic colloidal titania, alumina, zirconia, vanadia, chromia, or iron oxide may be used instead of hydrophobic fumed silica.

It is not intended to limit the present invention to particular embodiments described and exemplified in the foregoing specification, but various modifications may be made therein and thereto without departing from the scope and spirit of the invention as set forth in the following claims.

What is claimed is:

1. A hydrophobic composite comprising a core material selected from the group consisting of particulate and granular material having thereon an adherent first coat comprising a film-forming polyurethane, and a second coat which is bonded to said core material by said adherent first coat, said second coat comprising a hydrophobic colloidal oxide of an element selected from the group consisting of silicon, titanium, aluminum, zirconium, vanadium, chromium, iron or mixtures thereof.

2. The hydrophobic composite of claim 1, wherein said first coat includes asphalt in an amount up to about 50% by weight of said first coat.

3. The hydrophobic composite of claim 2, wherein said adherent first coat and said second coat each constitute from about 0.025% to about 0.25% by weight of said hydrophobic composite.

4. The hydrophobic composite of claim 3, wherein said second coat consists essentially of hydrophobic fumed silica and an amount of corundum up to about 100% by weight of said fumed silica.

5. The hydrophobic composite of claim 4, wherein said core material is a siliceous substance.

6. The hydrophobic composite of claim 5, wherein said siliceous substance is selected from the group consisting of sand, gravel and slag.

7. An aggregate consisting essentially of the hydrophobic composite of claim 6.

8. A method for producing hydrophobic composites which comprises the steps of:
    (a) providing core materials selected from the group consisting of particulate and granular material in a predetermined size range;
    (b) admixing said core materials with a coating composition comprising, by weight, from about 10% to about 20% of a film-forming polyurethane, from 0% to about 10% of asphalt and from about 70% to about 90% of a volatile solvent in which said film-forming polyurethane and asphalt are soluble, and removing substantially all of said solvent from the mixture of core materials and coating composition, thereby to deposit on said core materials and adherent first coat; and
    (c) applying to the core materials having said adherent first coat thereon, a second coat which is bonded to said core material by said adherent first coat, said second coat comprising a hydrophobic colloidal oxide of an element selected from the group consisting of silicon, titanium, aluminum, zirconium, vanadium, chromium, iron or mixtures thereof thereby to provide a hydrophobic composite.

9. The method of claim 8, wherein said core materials are admixed with said coating composition, excluding the volatile solvent, in an amount of up to 0.5% by weight of said core materials in applying said adherent first coat.

10. The process of claim 9, wherein the solvent component of said coating composition used in applying said adherent first coat is removed by evaporative heating.

11. The process of claim 10, where said core material is sand and said second coat is hydrophobic fumed silica.

12. The process of claim 10, wherein said second coat is applied to the core materials having said adherent first coat thereon at an elevated temperature and the resultant hydrophobic composite is thereafter cooled to ambient temeprature.

13. A water-repellent coating composition comprising an aggregate of the hydrophobic composite of claim 3 and a binding agent.

14. The composition of claim 13, wherein the binding agent is a liquid binding agent selected from the group consisting of asphalt, coal tar, paint, varnish, lacquer, liquid plastic or adhesive material.

15. The composition of claim 13, wherein said binding agent comprises less than 10% by weight of said composition.

16. The hydrophobic composite of claim 1 wherein said core material is selected from the group consisting of sand, gravel, mine tailings, coal ash, natural rock, smelter slag, diatomaceous earth, crushed charcoal, sawdust, mica, wood chips and nut shells.

17. The hydrophobic composite of claim 1 wherein said core material has a particle size in the range of 25 millimeters to 125 microns.

18. The hydrophobic composite of claim 1 wherein said second coat includes a powdered abrasive material.

19. The hydrophobic composite of claim 18 wherein said powdered abrasive material comprises powdered corundum.

20. The hydrophobic composite of claim 18 wherein the particle size of said powdered abrasive material is less than 50 microns.

21. The method of claim 8 wherein said core material is selected from the group consisting of sand, gravel, mine tailings, coal ash, natural rock, smelter slag, diatomaceous earth, crushed charcoal, sawdust, mica, wood chips and nut shells.

22. The method of claim 8 wherein said core material has a particle size in the range of 25 millimeters to 125 microns.

23. The method of claim 8 wherein said core material is a siliceous substance.

24. The method of claim 23 wherein said siliceous substance is selected from the group consisting of sand, gravel and slag.

25. The method of claim 8 wherein said second coat includes a powdered abrasive material.

26. The method of claim 25 wherein said powdered abrasive material comprises powdered corundum.

27. The method of claim 25 wherein the particle size of said powdered abrasive material is less than 50 microns.

* * * * *